United States Patent [19]

Birnkraut et al.

[11] 4,032,692

[45] June 28, 1977

[54] PROCESS FOR ADHESIVE BONDING AND COATING

[75] Inventors: Hans-Walter Birnkraut, Oberhausen; Werner Kluy, Bochum-Stiepel, both of Germany

[73] Assignee: Ruhrchemie Aktiengesellschaft, Oberhausen, Germany

[22] Filed: Jan. 14, 1976

[21] Appl. No.: 649,154

Related U.S. Application Data

[62] Division of Ser. No. 487,182, July 10, 1974, Pat. No. 3,971,690.

[30] Foreign Application Priority Data

Jan. 10, 1974 Germany .................. 2400978

[52] U.S. Cl. .................. 428/442; 428/463; 428/520; 428/522; 428/537; 526/303; 427/207 A; 156/331; 156/332; 526/318

[51] Int. Cl.$^2$ .................. B32B 17/10; B05D 5/10

[58] Field of Search .......... 428/442, 463, 520, 522, 428/537; 260/86.7, 88.1 R, 78.5 HC; 427/207; 156/278, 331, 332; 526/303, 318

[56] References Cited

UNITED STATES PATENTS

| 2,994,632 | 8/1961 | Brown et al. | 428/520 X |
|---|---|---|---|
| 3,132,120 | 5/1964 | Graham et al. | 260/88.1 R |
| 3,361,696 | 1/1968 | Bolgiano et al. | 428/522 X |
| 3,362,844 | 1/1968 | Christenson et al. | 428/520 X |
| 3,503,529 | 3/1970 | Brown | 428/520 X |
| 3,681,313 | 8/1972 | Anspon et al. | 260/86.7 |

FOREIGN PATENTS OR APPLICATIONS

2,119,047 11/1972 Germany

*Primary Examiner* — P. C. Ives
*Attorney, Agent, or Firm* — Bierman & Bierman

[57] ABSTRACT

A process is described for bonding or coating materials which comprises applying a molten olefin copolymer to a substrate. The copolymer is a terpolymer comprising about 70–90 parts by weight of ethylene, about 0.5–10 parts by weight of an ethylenically unsaturated carboxylic acid amide, and about 0.5 to 20 parts by weight of an ethylenically unsaturated carboxylic acid ester. The sum of the above parts by weight is equal to about 100.

6 Claims, No Drawings

PROCESS FOR ADHESIVE BONDING AND COATING

This is a Divisional Application of copending Ser. No. 487,182 filed July 10, 1974 now U.S. Pat. 3,971,690, issued July 27, 1976, which claims the priority of German Ser. No. P 24 00 879.7 filed Jan. 10, 1974.

This invention relates to a process for bonding materials together or coating said materials with the use of an olefin copolymer containing carboxylate and carboxamide groups as a bonding agent or coating compound. In this process, the substrates are adhesively bonded together by the molten copolymer or coated with it at an elevated temperature and, if desired, under an elevated pressure.

It is known, to bond materials together or coat materials with the use of olefin polymers obtained by copolymerization of ethylene and ethylenically unsaturated carboxylic acids (see U.S. Pat. No. 3,132,120) or ethylene, and an ethylenically unsaturated carboxylic acid and an ester of the latter (DOS 1,669,685). Acrylic acid is especially preferred as the unsaturated carboxylic acid. The presence of carboxyl groups in the polymer has been considered necessary in cases where metals have to be coated or bonded together with plastic materials with high adhesion. Actually, ethylene/vinyl acetate copolymers which have been described as adhesives are not suitable for coating metals, but are almost exclusively adaptable for coating paper and for producing multi-layer film and composite film (see "Coating", Vol. V 1972, 11, 330-1).

The production of copolymers and terpolymers containing acrylic acid involves considerable difficulties which are chiefly due to the fact that acrylic acid and its homologues are corrosive. Because of this behavior, damage and deterioration to metering apparatus and reactors frequently occurs. Extensive efforts have been made to avoid these disadvantages. Thus, French Pat. No. 1,596,991 discloses a process for producing copolymers of ethylene, acrylic acid and acrylic acid esters starting from ethylene and acrylic acid esters of tertiary alcohols which partially split off alkene at high polymerization temperatures thereby yielding free carboxyl groups in the polymer. However, this process results in polymers which are not sufficiently homogeneous and are not suitable for producing thin film. An improved mode of operation which requires additional operational steps is known from German Offenlegungsschrift 2,119,047.

Ethylene copolymers containing acrylic acid may also be produced by treating copolymers of ethylene and isopropyl acrylates at 320° C. in the presence of steam and ammonia (cf. U.S. Pat. No. 3,681,313). This process is also technically inconvenient and laborious and unsatisfactory from an economical point of view.

In addition to the above problems in production, binary and ternary copolymers containing acrylic acid have fundamental deficiencies which are due to the presence of carboxyl groups in the macromolecule. Due to the formation of hydrogen bridges, the carboxyl groups favor the accumulation of water between the coat and the substrate. Hence, the polymer readily becomes detached from the substrate. This occurs to a particularly high degree if the bonding mechanism is based on the carboxylic acid groups of the adhesive as in the case of adhesion to metals (see W. H. Smarrok and S. Bonotto, Polym. Engin. and Science, January, 1968, p. 45).

It is an object of this invention to provide a process for bonding materials together or coating materials which does not exhibit the disadvantages mentioned above.

It has now been surprisingly found that excellent bonding and coating results can be achieved through the use of olefinic copolymers. Briefly, this discovery, which constitutes the present invention, comprises bonding materials together or coating them by applying a particular molten olefin copolymer. The copolymer is a terpolymer which comprises about 70 to 90 parts by weight of ethylene, about 0.5 to 10 parts by weight of an ethylenically unsaturated carboxylic acid amide, and about 0.5 to 20 parts by weight of an ethylenically unsaturated carboxylic acid ester. The sum of the above parts by weight is about 100.

The high adhesive power of the present terpolymers containing acid amide groups could not be predicted by the skilled artisan because (a) copolymers of ethylene and unsaturated carboxylic acid esters have no adhesion, and (b) copolymers of ethylene and unsaturated carboxylic acid amides have only very poor adhesion to various substrates. Hence, a synergistic result has been discovered in that the present terpolymers display excellent adhesive qualities.

The excellent adhesiveness of the terpolymers used in the present invention cannot be attributed to the formation of carboxylic acid groups from the acid amide or ester residues. It has been found by analysis that the polymers contain less than 0.5% and in most cases less than 0.1% by weight of acid in polymerized form. It is well-known that this proportion is insufficient to effect high adhesion. In a preferred embodiment of the present invention, the olefin copolymer used is a terpolymer which contains about 80 to 90 parts by weight of ethylene, about 2.5 to 8 parts by weight of the amide of an ethylenically unsaturated $C_3$–$C_5$ carboxylic acid, and about 7 to 15 parts by weight of the $C_1$–$C_8$ alkyl ester of an ethylenically unsaturated $C_3$–$C_5$ carboxylic acid, the sum of the parts of weight being 100. The use of an olefin copolymer containing 80 to 90 parts by weight of ethylene, 2.5 to 8 parts by weight of acrylamide, and 7 to 15 parts by weight of a $C_2$–$C_5$ alkyl ester of acrylic acid with the sum of the parts by weight being 100 has been found to be particularly advantageous. t-butyl acrylate is particularly useful as the $C_2$–$C_5$ alkyl ester of acrylic acid.

The process according to the invention is useful for coating and bonding various substrates, especially metals, polyolefins, glass, wood, textiles, paper, etc. The process permits bonding both like and different materials. For example, it is possible to bond metals not only to themselves or other metals, but also to glass or plastic materials. Like or different plastic materials may also be bonded together. Bonding glass together by means of terpolymers described above is of importance for the production of safety glass.

The adhesive joints obtained from the present invention are extremely strong and durable. Therefore, the process is applicable very successfully, for example, to the production of sandwich structures from the components metal-plastics-metal. Composite materials of this kind have a number of advantageous properties permitting their use in various fields such as craft building, aircraft construction, shipbuilding and sound heat insulation. A particular advantage of the novel mode of operation is that the adhesion of the terpolymers used as bonding agents and coating compounds is hardly influenced by the action of water, even for extended periods of time. Further, conventional methods can be used in applying the terpolymers to the materials to be bonded or coated. Examples of suitable methods include extrusion coating, calender coating and flame-spraying.

Metal parts which have been coated by the new mode of operation can additionally be protected from mechanical influences by bonding with compositions containing other olefin polymers. Hence, the present invention can be utilized to bond polyethylene to steel pipe. It is well known that polyethylene-clad pipe is of great importance in many commercial applications.

Contrary to other processes of the prior art, it is unnecessary to resort to preliminary treatments such as degreasing, mechanical roughening or oxidative chemical pretreatments when utilizing the present invention.

The production of the copolymers to be used in accordance with the invention is known. The production of the copolymers by the high pressure process is described, for example, in DAS 1,645,018.

Preferred embodiments of the present invention are illustrated in the Examples which follow. In these experiments, the process was applied to several materials and adhesion was determined.

Adhesion was determined as follows:

Cleaned aluminum strips measuring 100 mm. in length, 100 mm. in width and 1.5 mm in thickness were bonded together over a length of 70 mm. by means of 0.2 mm. thick films of ethylene copolymer with compression (pressure, 3 kgs./sq.cm.; time of compression, 30 to 40 seconds; temperature of compression, 180° C.). In another case, aluminum strips of the same size were bonded to an LDPE-sheet of 4 mm. thickness under the same conditions. The unbonded lengths of the aluminum strips were bent off at right angles in opposite directions.

The performance of the adhesive is primarily described by the peeling strength. This is represented by the force per unit length which is necessary to separate the adhesive joint. As there is a difference between adhesion and sliding in case of friction, it is desirable to differentiate between initial tear resistance and tear propagation resistance per unit tear length. For satisfactory adhesion of a product, tear propagation strength is of importance.

These physical parameters were measured by means of a tensile tester. Those parts of the aluminum sheets (30 × 100 sq. mm.) which extended at right angles to the bonded area were clamped in jaws so that the bonded area (70 × 100 sq. mm.) extended orthogonally with respect to the jaws. The jaws were then separated at a rate of 50 mm./minute. At the same time, the tearing forces which are characteristic of the tensile properties were recorded by means of a recorder.

It can be seen from the compilation of adhesive data in the Table, infra, that:

1. The adhesive film used in test 1, i.e. a polymer of ethylene, acrylic acid and a $C_2$–$C_5$ alkyl acrylate, corresponds to the prior art. Copolymers consisting of ethylene and a $C_2$–$C_5$ alkyl acrylate or of ethylene and acrylamide show only poor adhesion (tests 2 and 3).

2. Terpolymers of ethylene, $C_2$–$C_5$ alkyl acrylate and small amounts of acrylamide have a lower degree of adhesion on aluminum sheet (tests 4 and 5). Adhesion is substantially improved by increasing the proportion of acrylamide to about 8% by weight (tests 6 to 10) without unfavorably affecting the physical properties of the polymer.

EXAMPLE 1

Ethylene copolymers containing acrylamide and acrylates were processed to a film of about 0.2 mm. thickness by compression molding or extrusion.

Compression molded film was produced from ground copolymer which was placed between a glass fiber reinforced Teflon cover and, with iron sheet metal of 4 mm. thickness having been placed on both sides, pressed under the following conditions:

Compression molding pressure — 20 kgs./sq.cm.
Compression molding time — 2 minutes
Compression molding temperature — 180° C.

Film which was plasticized throughout was obtained.

To produce the adhesive film by extrusion, pelletized copolymer was used and extruded through the flat sheeting die of a Collin extruder at 170° C. to form a flat sheet of 0.2 mm. thickness.

A sheet having been produced by one of the processes described above (composition: 80.3% by weight of ethylene, 12.6% by weight of t-butyl acrylate and 7.1% by weight of acrylamide) and having a thickness of about 0.2 mm. was placed between two cleaned aluminum sheets having a size of 100 × 100 × 0.15 mm$^3$. and pressed at 180° C. under a pressure of 20 kgs./sq.cm. To evaluate the performance of the adhesive sheet, the peel strength was determined by the method described above. The measurement gave an initial tear resistance of 11.2 kgs./cm. and a resistance to tear progagation of 2.8 kgs./cm. In a comparative test, an ethylene/acrylic acid/t-butyl acrylate terpolymer containing 8.3% by weight of acrylic acid and 7% by weight of t-butyl acrylate had an initial tear resistance of 7.2 to 8 kgs./cm. and a resistance to tear propagation of 3 kgs./cm. when tested by the same method.

EXAMPLE 2

A composite sheet consisting of Al/adhesive sheet/Al was produced by the procedure of Example 1, the terpolymer consisting of 83.4% by weight of ethylene, 10.5% by weight of n-butyl acrylate and 6.1% by weight of acrylamide. The product had an initial tear resistance of 7.2 to 7.5 kgs./cm. and a resistance to tear propagation of 2.7 kgs./cm.

EXAMPLE 3

A sandwich structure comprising aluminum/terpolymer/polyethylene/terpolymer/aluminum was produced using a copolymer consisting of 84.2% by weight of ethylene, 8.9% by weight of t-butyl acrylate and 6.9% by weight of acrylamide.

Best adhesion was obtained using a pressure of 2 to 3 kgs./sq.cm., compression molding times of 30 to 45 seconds and temperatures of 180° C. Under these conditions the LDPE sheet became plastic only on the surfaces to be bonded and the total thickness of the structure was maintained.

Sandwich structures having low specific gravity and satisfactory physical characteristics were obtained. The resistance to tear propagation was 3.8 kgs./cm. as compared with 3.5 kgs./cm. for a sandwich structure produced in the same manner but with the use of a terpolymer consisting of 89% by weight of ethylene, 7% by weight of t-butyl acrylate and 4% by weight of acrylic acid.

EXAMPLE 4

Under the conditions described in Example 3, a sandwich structure comprising iron/terpolymer/polyethylene/terpolymer/iron was produced using a copolymer having a melt index of 4.5 and consisting of 85% by weight of ethylene, 8.2% by weight of tert-butyl acrylate and 6.2% by weight of acrylamide. The polyethylene used for the central layer was a high pressure polyethylene having a melt index of 0.2 and a density of 0.918.

The sandwich structure had an initial tear resistance of the bonded surfaces of iron/polyethylene of 2.3 kgs./cm. and a resistance to tear propagation of 1.6 kgs./cm.

EXAMPLE 5

A sheet having a thickness of about 0.200 mm. and consisting of a terpolymer having a melt index of 4.5 and composed of 85.5% by weight of ethylene, 8.4% by weight of n-butyl acrylate and 6.1% by weight of acrylamide was placed between two plywood plates of 5 mm. in thickness. The plywood plates were clamped in a screw clamp and the system was heated in an oven for 15 minutes at 200° C. When testing the composite plate in a tensile tester, the plywood was torn at 40 kgs./cm. while the adhesive joint was unaffected.

Table 1

| Test No. | Acrylic acid wt.% | Acrylate wt.% | Acrylate Alcohol moiety | Acrylamide wt.% | Ethylene wt.% | Adhesion with aluminum sheet as composite Initial tear kgs./cm. | Adhesion with aluminum sheet as composite Tear propagation kgs./cm. | LDPE as interlayer Initial tear kgs./cm. | LDPE as interlayer Tear propagation kgs./cm. |
|---|---|---|---|---|---|---|---|---|---|
| 1 | 8.3 | 7.0 | t-$C_4$ | — | 84.7 | 7.5 | 3.0 | 7.1 | 3.5 |
| 2 | <0.1 | 16.8 | n$C_4$ | — | 83.2 | no adhesion | — | | |
| 3 | <0.1 | — | — | 8.1 | 91.9 | 2.3 | 0.3 | | |
| 4 | <0.1 | 7.8 | n$C_4$ | 1.0 | 91.2 | 1.5 | 0.2 | | |
| 5 | 0.1 | 7.9 | " | 1.4 | 90.7 | 2.5 | 0.2 | | |
| 6 | 0.1 | 7.6 | " | 2.7 | 89.7 | 3.8 | 1.1 | | |
| 7 | <0.1 | 10.5 | " | 6.1 | 83.4 | 7.3 | 2.7 | | |
| 8 | 0.45 | 7.7 | t-$C_4$ | 6.9 | 85.95 | 9.7 | 2.7 | 10.0 | 3.8 |
| 9 | 0.45 | 12.6 | " | 7.1 | 79.85 | 11.2 | 2.8 | | |
| 10 | <0.1 | 10.1 | $C_2$ | 6.5 | 83.4 | 7.5 | 2.8 | | |

What is claimed is:

1. A process for coating a material which consists essentially of applying to said material a laminar terpolymer comprising about 70 to 90 parts by weight of ethylene, about 0.5 to 10 parts by weight of an ethylenically unsaturated carboxylic acid amide, there being only hydrogen on the amide nitrogen; and about 0.5 to 20 parts by weight of an ethylenically unsaturated carboxylic acid ester, the sum of said parts by weight being about 100; and heating the terpolymer to a temperature sufficient to cause it to melt, thereby bonding said terpolymer to said material.

2. The process of claim 1 in which the terpolymer comprises about 80 to 90 parts by weight of ethylene, about 2.5 to 8 parts by weight of the amide and about 7 to 15 parts by weight of the ester.

3. The process of claim 1 in which the amide is of an ethylenically unsaturated carboxylic acid having about 3 to 5 carbon atoms, and the ester is an alkyl ester of an ethylenically unsaturated carboxylic acid having about 3 to 5 carbon atoms, the ester moiety having about 1 to 8 carbon atoms.

4. The process of claim 1 in which the amide is acrylamide and the ester is of acrylic acid, the ester moiety having 2 to 5 carbon atoms.

5. The process of claim 1 in which the amide is acrylamide and the ester is t-butyl acrylate.

6. A process for coating a material which consists essentially of applying to said material a molten terpolymer comprising about 70 to 90 parts by weight of ethylene, about 0.5 to 10 parts by weight of an ethylenically unsaturated carboxylic acid amide, there being only hydrogen on the amide nitrogen, and about 0.5 to 20 parts by weight of an ethylenically unsaturated carboxylic acid ester, the sum of said parts by weight being about 100.

* * * * *